United States Patent
Kawawada et al.

(10) Patent No.: US 6,176,618 B1
(45) Date of Patent: Jan. 23, 2001

(54) DYNAMIC PRESSURE BEARING, SPINDLE MOTOR USING DYNAMIC PRESSURE BEARING, AND ROTARY DEVICE HAVING THE SPINDLE MOTOR AS DRIVING SOURCE

(75) Inventors: Naoki Kawawada; Isamu Takehara, both of Chiba (JP)

(73) Assignee: Seiko Instruments Inc. (JP)

( * ) Notice: Under 35 U.S.C. 154(b), the term of this patent shall be extended for 0 days.

(21) Appl. No.: 09/215,723

(22) Filed: Dec. 18, 1998

(30) Foreign Application Priority Data

Dec. 18, 1997 (JP) .................................................. 9-363829

(51) Int. Cl.[7] .................................................. F16C 32/06
(52) U.S. Cl. ........................... 384/107; 384/112; 384/132
(58) Field of Search .................................. 384/100, 107, 384/111, 112, 113, 121, 123, 124, 132

(56) References Cited

U.S. PATENT DOCUMENTS

| | | | | |
|---|---|---|---|---|
| 5,407,281 | * | 4/1995 | Chen | 384/107 |
| 5,487,608 | * | 1/1996 | Leuthold et al. | 384/113 |
| 5,653,540 | * | 8/1997 | Heine et al. | 384/123 |
| 5,667,309 | * | 9/1997 | Nose | 384/132 |
| 5,791,785 | * | 8/1998 | Nose et al. | 384/107 X |
| 5,847,479 | * | 12/1998 | Wang et al. | 384/107 X |

\* cited by examiner

*Primary Examiner*—Thomas R. Hannon
(74) *Attorney, Agent, or Firm*—Adams & Wilks

(57) ABSTRACT

A spindle motor has a rotor, a stator and a dynamic pressure bearing for supporting the rotor for rotation relative to the stator. The dynamic pressure bearing comprises a rotational shaft mounted for undergoing rotation and having a thrust bearing portion and a radial bearing portion. A bearing member rotatably supports the rotational shaft and has a closed end forming a small diameter cylinder portion for receiving the radial bearing portion of the rotational shaft and an open end forming a large diameter cylinder portion for receiving the thrust bearing portion of the rotational shaft such that first gaps for receiving a lubricating oil are formed between the rotational shaft and the bearing member. A thrust pressure member is connected to the bearing member to form a capillary seal between the rotational shaft and the open end of the bearing member and to form second gaps between the thrust pressure member and the rotational shaft for receiving a lubricating oil. An oil receiving groove is formed in at least one of the thrust pressure member and the rotational shaft for receiving a lubricating oil.

21 Claims, 5 Drawing Sheets

DYNAMIC PRESSURE BEARING, SPINDLE MOTOR USING DYNAMIC PRESSURE BEARING, AND ROTARY DEVICE HAVING THE SPINDLE MOTOR AS DRIVING SOURCE

BACKGROUND OF THE INVENTION

Field of the Invention

The present invention relates to a dynamic pressure bearing, a spindle motor using the dynamic pressure bearing, and a rotary device having the spindle motor as a driving source and, more specifically, to a spindle motor in which a rotor is supported by a stator through the dynamic pressure bearing.

Dynamic pressure bearings are suitable as bearings of a rotary device in the fields of computers and copy machines because they can be miniaturized and can operate with smooth, high speed revolution. Particularly, as an air dynamic pressure bearing does not use a lubricant such as oil, a rotator such as a magnetic disk is never soiled. As a result, the air dynamic pressure bearing is adopted widely for a rotator device. However, the air dynamic pressure bearing has disadvantages, including that stiffness of the bearing is very low and that production is difficult because it requires a bearing gap of several micron order. In view of the foregoing disadvantages, a liquid dynamic pressure bearing having high stiffness and which is easy to produce has been developed.

The prior art is disclosed in U.S. Pat. No. 5,487,608. The device is a shaft rotation type spindle motor having a liquid dynamic pressure bearing in which lower end of the bearing is closed end, upper end of the bearing is opened end, and a radial bearing portion is formed at upper portion and a thrust bearing portion is formed at lower portion. When the spindle motor rotates at high speed, the radial bearing portion and the thrust bearing portion are constructed so that net flow of lubricating oil by dynamic pressure orients to the closed end direction at the radial bearing portion, net flow of lubricating oil by dynamic pressure orients to radial bearing portion direction, and net flow connected with these flows orients to the closed end of the bearing. Therefore, lubricating oil does not leak from the bearing when the motor rotates at high speed. A capillary seal is provided at the opened end so that lubricating oil does not leak out of the bearing when the motor stops.

A prior art bearing assembly is disclosed in U.S. Pat. No. 5,487,608 which is incorporated herein by reference. FIG. 4 of U.S. Pat. No. 5,487,608 has been replicated herein as FIG. 9. The bearing assembly comprises a shaft rotation-type spindle motor having a liquid dynamic pressure bearing. The bearing assembly comprises a stationary sleeve 70 has a lower portion 40, an interior surface forming a bushing 72, a tapered surface 162, a vertical surface 181, and an outer circumferential surface 182. A rotating shaft 52 constituting a cylindrical radial bearing member is mounted for rotation relative to the stationary sleeve 70. The rotating shaft 52 has hubs 174 and 180 and defines a radial bearing portion. Upper and lower journal bearings 130, 132 are disposed between the stationary sleeve 70 and the rotating shaft 52. A thrust plate 74 and a counterplate 76 define a thrust bearing portion of the bearing assembly. The thrust plate 74 has bearing surfaces 120, 122 and is stepped at 75 into a lower end of the rotating shaft 52 and extends into a recess 90 defined by a lower end of the bushing 72 and an upper surface of the counterplate 76. The counterplate 76 is pressed against the lower portion of the stationary sleeve 70 and sits in against a step as shown at 78. Immediately below the counterplate 76 is located a shield 84 which is provided to close the bearing assembly from the outside. The bearing assembly is further provided with gaps 92, 94, 96, recesses 80, 90, a bores 102, 134, a groove 104, a reservoir 100, equipressure grooves 136, 150, a capillary seal 160, a gas trap 170, and a labyrinth seal 172. A lower end of the bearing assembly is closed, an upper end of the bearing assembly is opened, the radial bearing portion is formed at the upper end, and the thrust bearing portion is formed at the lower end.

When a spindle motor of the bearing assembly rotates at a high speed, the radial bearing portion and the thrust bearing portion are constructed so that the net flow of lubricating oil by dynamic pressure orients in the closed end direction at the radial bearing portion, the net flow of lubricating oil by dynamic pressure orients in the radial bearing portion direction, and the net flow connected with these flows orients to the closed end of the bearing. Therefore, lubricating oil does not leak from the bearing when the motor rotates at high speed. The capillary seal 160 is provided at the opened end so that lubricating oil does not leak out of the bearing when the rotor stops.

The spindle motor disclosed in U.S. Pat. No. 5,487,608 is a useful liquid dynamic pressure bearing which has high stiffness and which is easy to produce as compared to an air dynamic pressure bearing. However, construction of the liquid dynamic pressure bearing is complex. As shown in FIG. 9, two members, namely the thrust plate 74 and the counterplate 76 are needed to form the thrust bearing portion. A dynamic pressure generating groove which does not function properly due to its construction must be formed at the radial bearing portion and the thrust bearing portion. Furthermore, the bores 102, 134, a radial dynamic pressure generating portion, and a thrust dynamic pressure generating portion must be formed respectively at the rotating shaft 52. As a result, it is difficult to miniaturize and manufacture the liquid dynamic pressure bearing having the foregoing construction.

SUMMARY OF THE INVENTION

In view of the foregoing problems in the conventional art, it is an object of the present invention to prevent generation of over drawing of oil at an oil suction side of a dynamic pressure generating groove of a thrust bearing portion during high speed revolution of a spindle motor having a liquid dynamic pressure bearing with a disc-shaped thrust bearing member having no balance hole. This can be accomplished by providing a liquid dynamic pressure bearing comprising a rotational shaft mounted for undergoing rotation and having a disc-shaped thrust bearing portion at a central part thereof and a radial bearing portion, and a cylindrical bearing member for rotatably supporting the rotational shaft, the cylindrical bearing member having a closed end forming a small diameter cylinder portion for receiving the radial bearing portion of the rotational shaft and an open end forming a large diameter cylinder portion for receiving the disc-shaped thrust bearing portion so that a plurality of first gaps for receiving a lubricating oil are formed between the rotational shaft and the cylindrical bearing member.

Another object of the present invention is to insure that lubricating oil is not drawn much at the oil suction side of the dynamic pressure generating groove of a radial bearing portion during high speed revolution of the spindle motor having the rotational shaft and the cylindrical bearing member as set forth above.

Another object of the present invention is to provide a spindle motor having a liquid dynamic pressure bearing comprising the rotational shaft and the cylindrical bearing member, as set forth above, in which unstableness of revolution caused by a half whirl instability phenomenon is decreased and stable revolution is obtained while supporting a high load even at high speed revolution.

The foregoing and other objects of the present invention are achieved by a spindle motor in which a rotor is supported relative to a stator through a liquid dynamic pressure bearing. The spindle motor comprises a rotational shaft mounted for undergoing rotation and having a disc-shaped thrust bearing portion at a central part thereof and a radial bearing portion, a cylindrical bearing member for rotatably supporting the rotational shaft, the cylindrical bearing member having a closed end forming a small diameter cylinder portion for receiving the radial bearing portion of the rotational shaft and an open end forming a large diameter cylinder portion for receiving the disc-shaped thrust bearing portion so that a plurality of first gaps for receiving a lubricating oil are formed between the rotational shaft and the cylindrical bearing member, a disc-shaped thrust pressure member connected to the cylindrical bearing member to form a capillary seal between the rotational shaft and the open end of the cylindrical bearing member and to form a plurality of second gaps between the disc-shaped thrust pressure member and the rotational shaft for receiving a lubricating oil, and at least one oil receiving groove formed in at least one of the disc-shaped thrust pressure member and the rotational shaft for receiving a lubricating oil.

In one embodiment, the at least one oil receiving groove comprises a plurality of oil receiving grooves formed respectively at inner and outer diameter portions of the thrust dynamic pressure generating groove of the first thrust bearing and inner and outer diameter portions of the second thrust bearing. In another embodiment, the oil receiving groove is formed at the oil suction side of the radial dynamic pressure generating groove of the radial bearing.

DETAILED DESCRIPTION OF THE PREFERRED EMBODIMENTS

Figure 1:
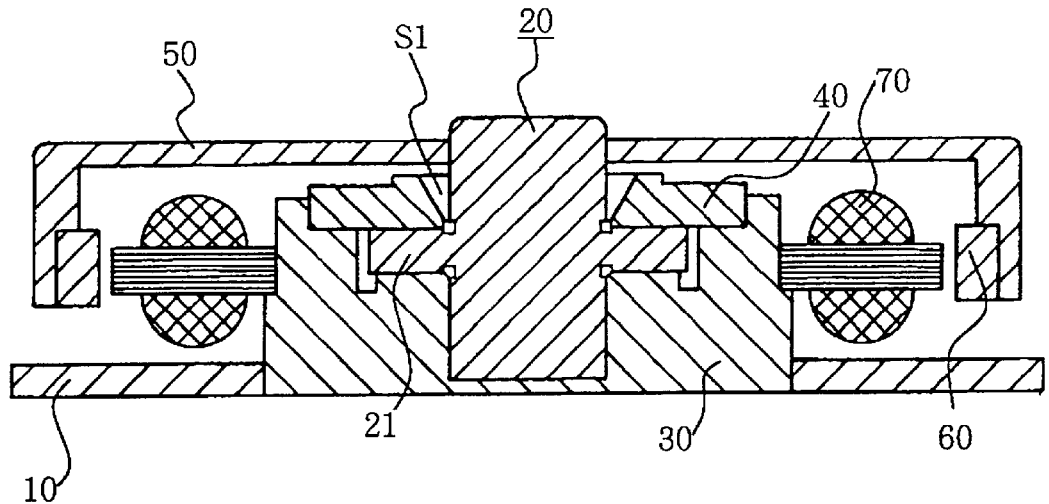
FIG. 1 is a cross-sectional view showing a spindle motor having a liquid dynamic pressure bearing according to the present invention.
Figure 2:
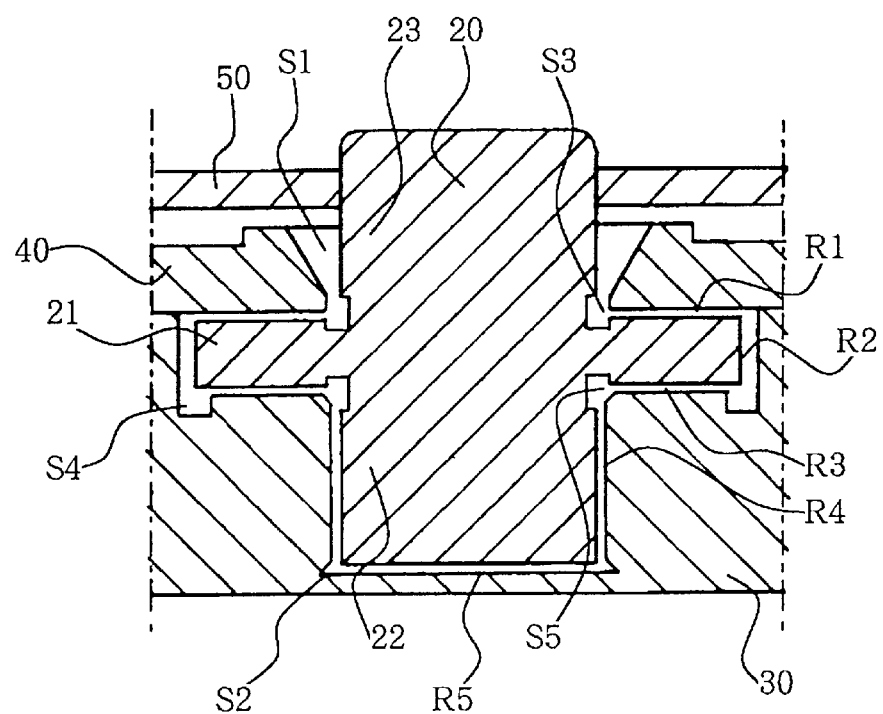
FIG. 2 is a partly enlarged view showing a spindle motor of FIG. 1 overstated at a bearing gap.
Figure 3:
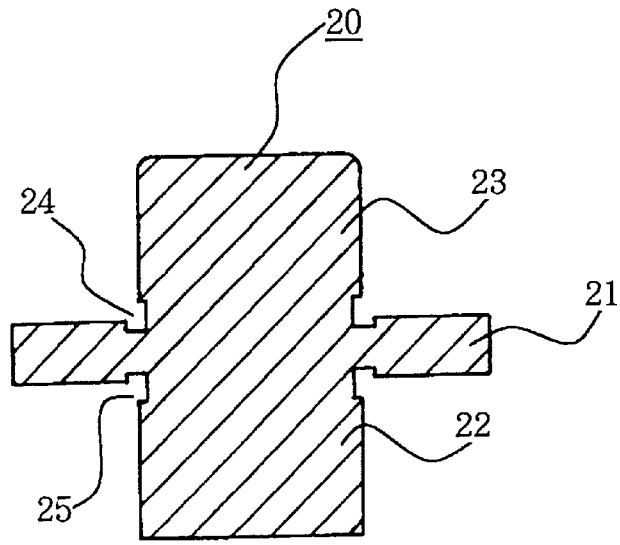
FIG. 3 is an enlarged cross-sectional view showing a columnar bearing member having a flange.

FIGS. 1 to 5 are views for describing embodiments of a shaft revolution-type spindle motor according to the present invention. FIG. 1 is a cross-sectional view of the shaft revolution-type spindle motor, and FIG. 2 is an enlarged view showing the main portion of the spindle motor overstated at a bearing gap. In these figures, symbol 10 is a fixing member comprising a part of a stator of the motor, symbol 20 is a columnar bearing member comprised of a rotational shaft formed integral with a disc-shaped thrust bearing member 21 at a central portion thereof, symbol 30 is cylindrical bearing member with stage fixed to the fixing table 10, and symbol 40 is a disc-shaped thrust pressure member. An upper end of the cylindrical bearing member 30 is an opened end a lower end is a closed end. The cylindrical bearing member 30 may be formed in one body with the fixing table 10. Symbol 50 is a cup-shaped hub comprising a part of the rotor, and is fixed at the columnar bearing member 20 by a fixing hole formed at a center portion thereof. Symbol 60 show rotor magnets comprising similarly a part of the rotor, and the rotor magnets are formed at an inner circumference face of the cup-shaped hub 50. Symbol 70 is a stator coil comprising a component of the stator, and is formed at an outer circumference face of the cylindrical bearing member 30, near the rotor magnets 60.

In the columnar bearing member 20 in which the disc-shaped trust bearing member 21 is formed, a column portion for radial bearing or a radial bearing portion 22 is formed at a lower side of the disc-shaped thrust bearing member 21. At an upper side of the disc-shaped thrust bearing member 21, a support column portion 23 is formed as shown in enlarged FIG. 3. At an outer circumference face of the columnar bearing member 20, a ring-shaped groove 24 is formed at a connecting portion of an upper circumference of the disc-shaped thrust bearing member 21 and the support column portion 23, and a ring-shaped groove 25 is formed at a connecting portion of the disc-shaped thrust bearing member 21 and the column portion for radial bearing 22.

Figure 4:
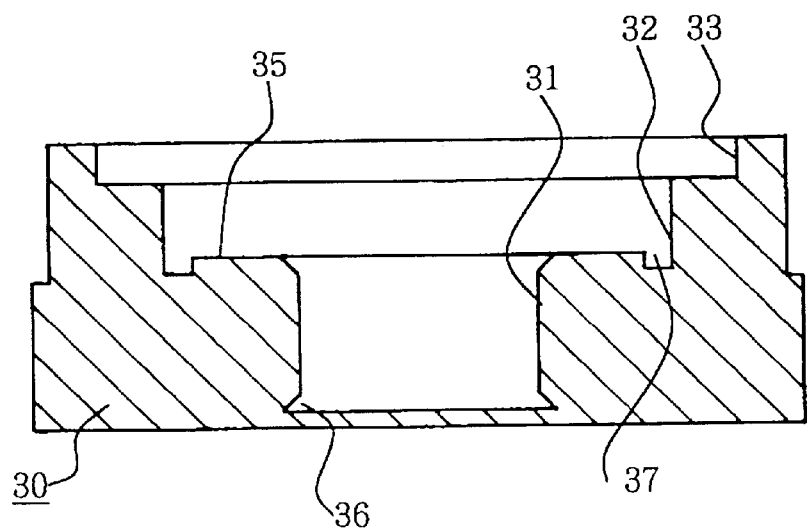
FIG. 4 is an enlarged cross-sectional view showing an embodiment of a cylindrical bearing member with stage.

Referring to FIG. 4, the cylindrical bearing member 30 is a cylindrical bearing member forming at least two cylinder portions, including a small diameter cylinder portion 31 where the column portion for radial bearing 22 of the columnar being member 20 is inserted rotatably, and a large diameter cylinder portion 32 where the disc-shaped thrust bearing member 21 is inserted rotatably. These two cylinder portions are disposed adjacent to each other in coaxial relation, and there is a border face 35 at the border of the two cylinder portions. A cylinder portion 33 disposed adjacent to the large diameter cylinder portion 32 in coaxial relation thereto receives and fixes the disc-shaped thrust pressure member 40 to seal the opened end of the cylindrical bearing member with a capillary seal. Symbol S1 is an oil receiving groove comprising the capillary seal. A ring-shaped enlarged portion 36 which is taper-shaped in cross-section is formed by machining at the closed end of the cylindrical bearing member 30, namely the lower end of the small diameter cylinder portion 31. A ring-shaped groove 37 is formed at an outer circumference portion of the border face 35 of the small diameter cylinder portion 31 and the large diameter cylinder portion 32.

Figure 5:
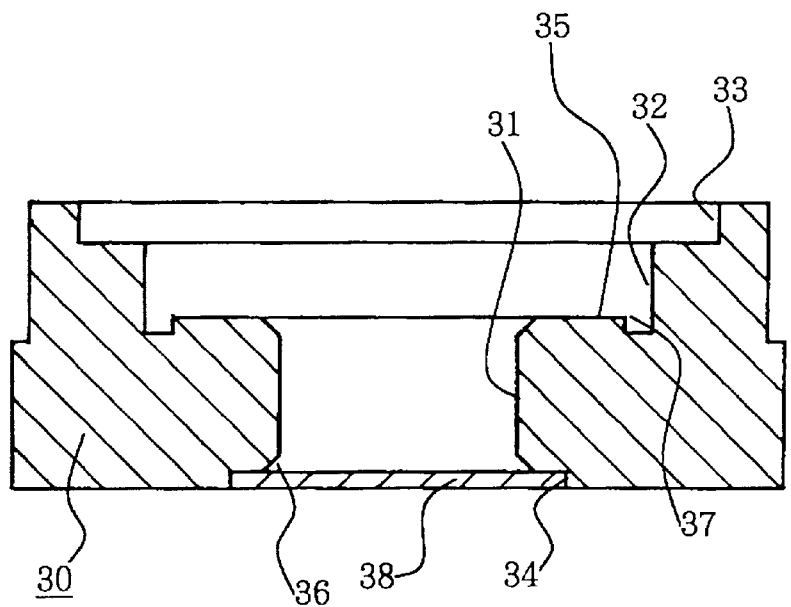
FIG. 5 is a cross-sectional view showing another embodiment of a cylindrical bearing member with stage.

The cylindrical bearing member 30 is formed by machining the cylinder portion for thrust pressure member 33, the large diameter cylinder portion 32, and the small diameter cylinder portion 31 in order from the top in FIG. 4. Therefore, the closed end and the opened end are formed at the same time. On the other hand, FIG. 5 shows a cylindrical bearing member 30 formed by sealing liquidtight the closed end using a sealing member 38. Namely in FIG. 5, although the cylindrical bearing member 30 is formed by machining the cylinder portion 33, the large diameter cylinder portion 32, and the small diameter cylinder portion 31 in order from the top similarly as in FIG. 4, a cylinder portion 34 is formed after forming the small diameter cylinder portion 31 so as to form opened ends at both the upper end and the lower end of the cylindrical bearing member 30. The sealing member 38 is disc-shaped and is fixed liquidtight at the cylinder portion 34. By this construction, the lower end of the small diameter cylinder portion 31, namely the lower end of the cylindrical bearing member 30, is closed. This construction has an advantage that machining the ring-shaped enlarged portion 36 with a taper-shaped cross-section at the lower end of the small diameter cylinder portion 31 is easy and an injection method for the lubricating oil can be used.

Figure 6:
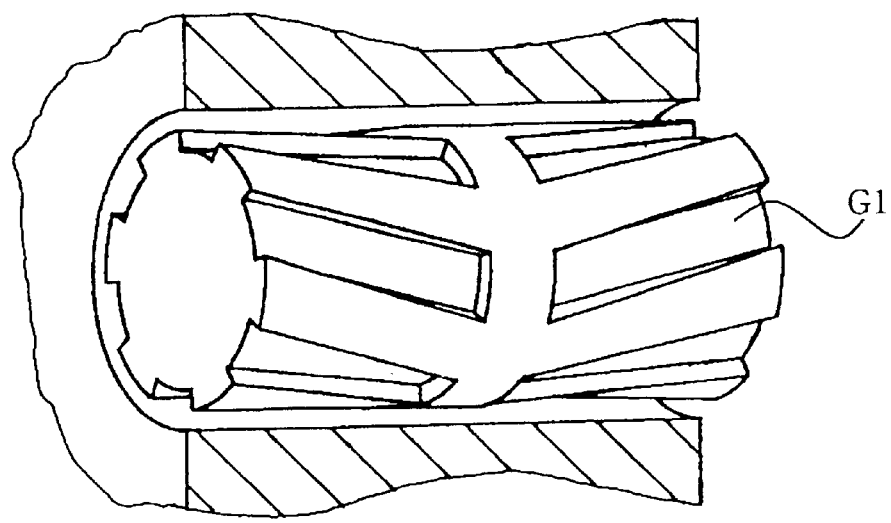
FIG. 6 is a view showing an example of radial dynamic pressure generating grooves.
Figure 7:
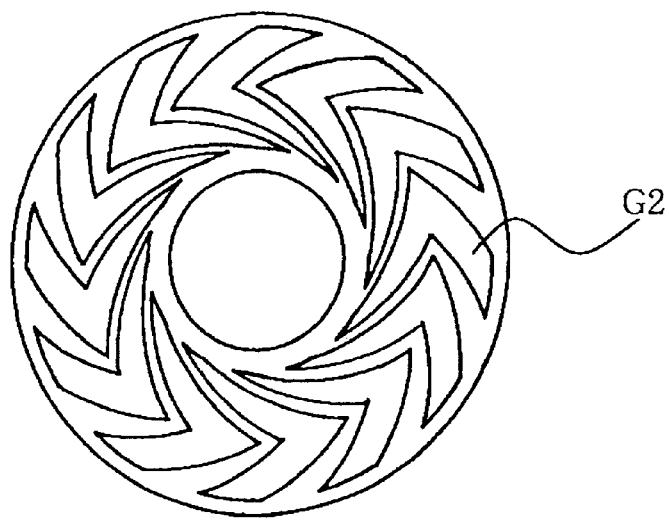
FIG. 7 is a view showing an example of thrust dynamic pressure generating grooves.

The liquid dynamic pressure bearing shown in FIG. 1 or FIG. 2 comprises one radial dynamic pressure bearing portion with a first thrust dynamic pressure bearing portion at an upper side thereof, and a second thrust dynamic pressure bearing portion at a lower side thereof. The radial dynamic pressure bearing portion comprises an outer circumference face of the column portion for radial bearing 22 and the columnar bearing member 20, and an inner circumference face of the small diameter cylinder portion 31 of the cylindrical bearing member 30. At any of the outer and the inner circumference faces, radial dynamic pressure generating grooves G1 as shown in FIG. 6 are formed, and at the other face, a flat face is formed. The upper side thrust dynamic pressure bearing portion comprises the upper face of the disc-shaped thrust bearing member 21 and a facing face, namely a lower face of the disc-shaped thrust presser member 40. At any of the upper and the lower faces, thrust dynamic pressure generating grooves G2 as shown in FIG. 7 are formed, and at the other face, a flat face is formed. The second thrust dynamic pressure bearing portion comprises lower face of the disc-shaped thrust bearing member 21 and the border face 35 between the small diameter cylinder portion 31 and the large diameter cylinder portion 32 of the cylindrical bearing member 30. At any of the lower face and the border face 35, thrust dynamic pressure generating grooves G2 as shown in FIG. 7 are formed, and at the other face, a flat face is formed.

In FIG. 2, symbol R1 is a narrow gap formed between the upper face of the disc-shaped thrust bearing member 21 and the lower face of the disc-shaped thrust pressure member 40 and includes a bearing gap of the first thrust dynamic pressure bearing portion. Symbol R2 is a narrow gap formed between the outer circumference face of the disc-shaped thrust bearing member 21 and an inner circumference face of the large diameter cylinder portion 32 of the cylindrical bearing member 30. Symbol R3 is narrow gap formed between the lower face of the disc-shaped thrust bearing member 21 and the border face 35 of the small diameter cylinder portion 31 and the large diameter cylinder portion 32 of the cylindrical bearing member 30, and includes a bearing gap of the second thrust dynamic pressure bearing portion. Symbol R4 is narrow gap formed between the outer circumference face of the column portion for radial bearing 22 of the columnar being member 20 and the inner circumference face of the small diameter cylinder portion 31 of the cylindrical bearing member 30, and includes a bearing gap of the radial dynamic pressure bearing portion. Symbol R5 is a narrow gap formed between the lower end face of the column portion for radial bearing 22, namely the lower end of the columnar bearing member 20, and closed end face of the cylindrical bearing member 30, namely the closed end face of the small diameter cylinder portion 31. In these gaps, a fitting value is selected at a range of about 4 to 20 micron meters at design. Lubricating oil is filled in these narrow gaps R1 to R5 by a vacuum injection method or a dripping method.

Symbols S1 to S5 are oil receivers or oil receiving grooves. The oil receiver S1 is a component of a capillary seal. The oil receiver S1 comprises the support column portion 23 of the columnar bearing member 20 and the disc-shaped thrust pressure member 40. Namely, the inner diameter bore of the disc-shaped thrust pressure member 40. Namely, the inner diameter bore of the disc-shaped thrust pressure member 40 has the cross section of a truncated cone shape which is formed by machining. By inserting the support column portion 23 in the bore, the oil receiver S1 having an expanded section as shown in FIG. 2 with the disc-shaped thrust pressure member 40 and the columnar bearing member 20, namely the oil receiver S1 expanding from the narrow end portion to the expanded end portion, is formed easily. The narrow end portion of the oil receiver S1 is an opened end, and is linked to the narrow gap R1 including the bearing gap of the first thrust dynamic pressure bearing portion. The expanded end portion of the oil receiver S1 is opened to outside air. When the spindle motor stops, lubricating oil is filled by a capillary action to the narrow end portion of the oil receiver S1 expanded to the end. Surface tension of the lubricating oil at this part and negative pressure applying to the lubricating oil at inside of the bearing when the lubricating oil moves to the direction of the expanded end portion of the oil receiver S1 prevents the lubricating oil from leaking out from the opened end of the bearing. Therefore, the oil receiver S1 having the expanding end portion opened to outside air and the narrow end portion linking to the narrow gap R1 including the bearing gap of the first thrust dynamic pressure bearing portion function to form the capillary seal. The oil receiver S1 is formed so that oil does not to leak out of the bearing even if lubricating oil moves to the expanded end portion from the narrow end portion of the oil receiver S1 due to increase in temperature and pressure.

The oil receiver S2 is an oil receiver for radial bearing formed to supply lubricating oil evenly over the radial bearing portion during high speed revolution. Although the oil receiver S2 is formed at the oil suction side of the radial dynamic pressure groove of the radial bearing portion, namely the outer diameter portion of the narrow gap R5 between the lower end face of the columnar bearing member 20 and the closed end face of the cylindrical bearing member 30, this can be formed easily by the ring enlarged portion 36 of the lower end of the cylindrical bearing member 30 and the outer circumference face of the column portion for radial bearing 22 of the columnar bearing member 20. By forming the oil receiver S2, oil shortage and bubbles do not appear at the oil suction side of the radial dynamic pressure generating groove during high speed revolution so as to generate high radial dynamic pressure. Therefore, stable high speed revolution can be obtained even for a high load.

The oil receivers S3, S4, and S5 are oil receivers for thrust bearing formed to supply lubricating oil evenly over the thrust bearing portion during high speed revolution. The oil receivers S3 and S5 are formed at the inner diameter portion of the thrust dynamic pressure generating groove of the thrust bearing portion, and the oil receiver S4 is formed at the outer diameter portion thereof. Concretely, the oil receiver S3 is a ring-shaped groove 24 formed at the columnar bearing member 20, and linked to the inner diameter side end portion of the narrow gap R1. The oil receiver S5 is a ring-shaped groove 25 formed at the columnar bearing member 20, and linked to the inner diameter side end portion of the narrow gap R3. The oil receiver S4 is a ring-shaped groove 37 formed at the cylindrical bearing member 30, and linked to the outer diameter side end portion of the narrow gap R3. By forming the oil receivers S3, S4 and S5, oil shortage and bubbles do not appear at the oil suction side of the radial dynamic pressure generating groove during high speed revolution so as to generate enough thrust dynamic pressure.

As an embodiment of the present invention, a spindle motor having a liquid dynamic pressure bearing forming oil receivers for preventing over-drawing of oil at the oil suction side of both the thrust bearing portion and the radial bearing portion is described referring the figures. The liquid dynamic pressure bearing comprises a columnar bearing member having a disc-shaped thrust bearing member at a central portion thereof, and a radial bearing portion and a support columnar portion disposed at opposite sides of the central portion, a cylindrical bearing member having respectively a small diameter cylinder portion for rotatably receiving the radial bearing portion of the columnar bearing member, and a large diameter cylinder portion for rotatably receiving the disc-shaped thrust bearing member. However, the object of the present invention can be achieved if the oil receivers for preventing over-drawing of oil at the oil suction side are formed at only the thrust bearing portion or only the radial bearing portion.

Figure 8:
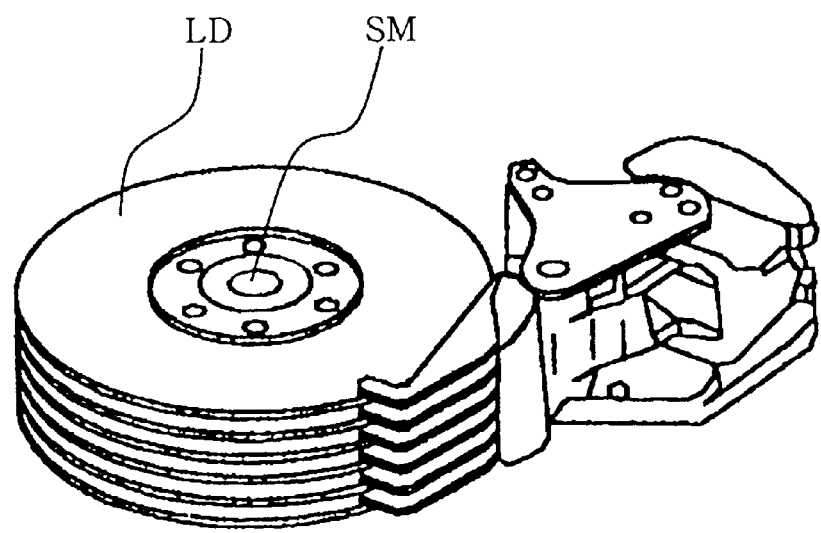
FIG. 8 is a perspective view showing an example of a rotary device having a spindle motor as a driving source.
Figure 9:
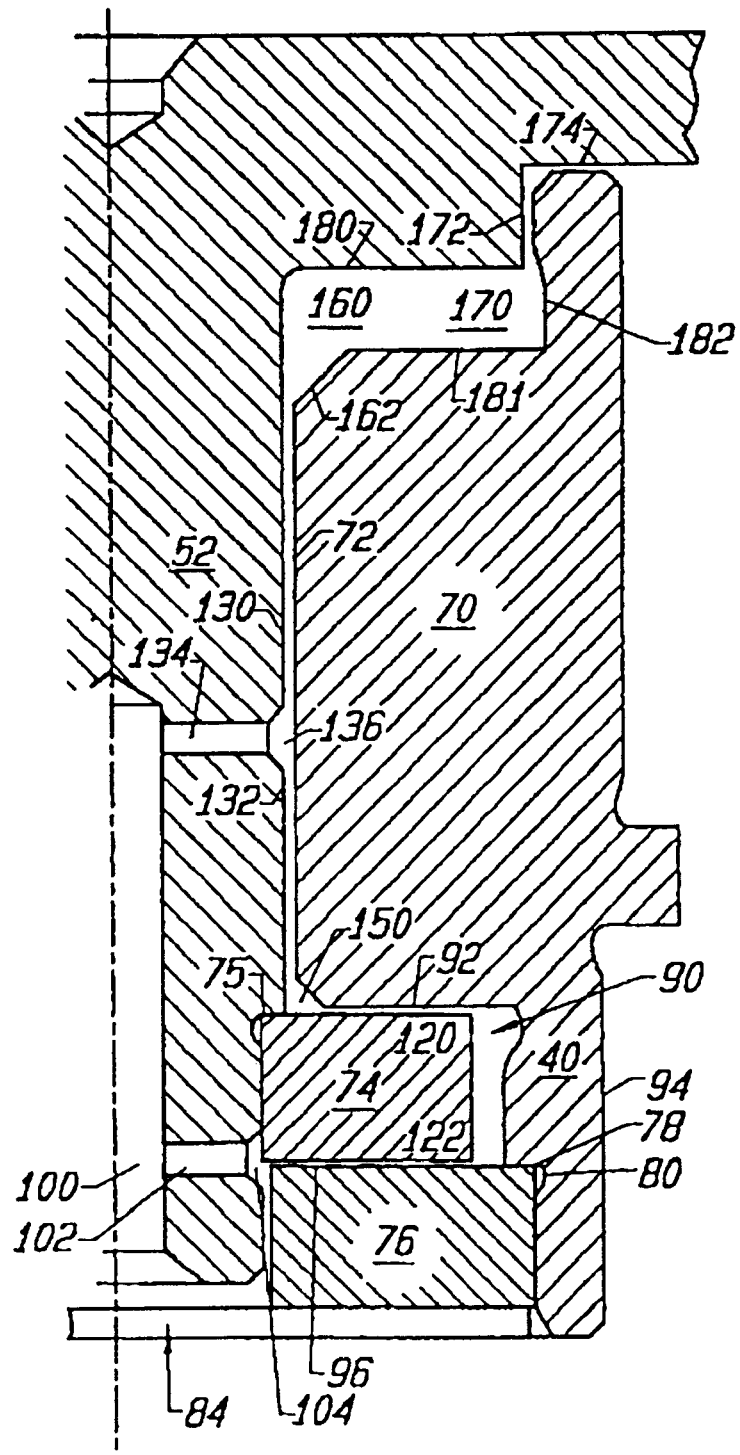
FIG. 9 is an enlarged cross-sectional view of a main portion of a prior art spindle motor having a liquid dynamic pressure bearing.

The spindle motor SM for driving a rotator LD such as a magnetic disc and an optical disc in the rotary device shown in FIG. 8, or for driving a rotator such as a polygon mirror in a rotary device, is usually DC brushless motor of the direct-driving type. The rotor magnets 60 formed at the inner circumference face of the cup-shaped hub 50 at right intervals and the stator coil 70 attached at the outer circumference face of the cylindrical bearing member 30 near the rotor magnets are components of an electromagnetic circuit of the DC brushless motor. To the stator coil 70, an exciting current is applied through an electronic rectifying circuit from a DC power source so as to act as an electromagnet for changing the polarity periodically. Stated otherwise, a magnetic field by the stator coil 70 changes periodically the direction of the magnetic field. By electromagnetic attraction and repulsion between the magnetic field of the stator coil 70 changing periodically the direction and magnetic field of the rotor magnets 60, a torque for driving the motor is generated.

In the present invention, the rotor magnets 60 and the stator coil 70 are formed so that a magnetic center, mainly the center of the magnetic circuit of the stator coil 70, substantially matches a cross-sectional center in the axial direction of the disc-shaped thrust bearing member 21. A center of cross-section in the axial direction of the disc-shaped thrust bearing portion 21 is formed at the central portion of the columnar bearing member 20, and which is located at substantially at a center of the liquid dynamic pressure bearing. Because of that, by substantially matching the magnetic center of the stator as above-mentioned, the path of the stator coil 70 is well balanced at upper and lower parts, and the magnetic resistance is decreased. Therefore, a magnetic field generating torque is used more efficiently than in the conventional device. As the member generating torque by electromagnetic action caused by the above-mentioned arrangement is located substantially at a center of the liquid dynamic pressure bearing, unstableness of rotation caused by a half whirl instability phenomenon can be extremely decreased.

In view of the foregoing, the present invention is directed to a spindle motor having a liquid dynamic pressure bearing comprising a columnar bearing member with an integral disc-shaped thrust bearing member disposed at a central portion in the axial direction, and a cylindrical bearing member rotatably receiving the columnar bearing member.

The present invention is also directed to a rotary device having the spindle motor as a driving source. In the spindle motor and the rotary device, an oil receiver is provided at any of, or both of the thrust bearing portion and the radial bearing portion. Therefore, the present invention has advantages that the construction is simple, it is easy to produce, it is possible to miniaturize, sliding with contact is decreased, and weight of the stator coil and core, and exciting current are decreased. These advantages are achieved by providing a liquid dynamic pressure bearing having a columnar bearing member with a special shape, and a cylindrical bearing member as main components, and by locating the rotor magnets and the stator coil so as to substantially match a magnetic center of the stator coil to a central axial direction of the disc-shaped thrust bearing member. Adding to these advantages, oil shortage and appearance of bubble of lubricating oil are removed at a part of the thrust bearing portion and the radial bearing portion during high speed revolution so that a smooth, stable, and high speed revolution is realized even for a high load.

According to the present invention, by forming the oil receiver S2 at the radial bearing portion, oil shortage and appearance of bubble are removed at the oil suction side of the radial dynamic pressure generating groove so as to generate high radial dynamic pressure. Therefore, stable, high speed revolution can be obtained even for a high load. By forming oil receivers S3, S4, and S5 at the thrust bearing portion, oil shortage and appearance of bubble are removed at the oil suction side of the thrust dynamic pressure generating groove during high speed revolution so as to generate enough thrust dynamic pressure. Moreover, the oil receivers for bearing S2 to S5 can be easily formed by machining.

What is claimed is:

1. A spindle motor comprising:
    a rotational shaft mounted for undergoing rotation and having a disc-shaped thrust bearing portion at a central part thereof and a radial bearing portion;
    a cylindrical bearing member for rotatable supporting the rotational shaft, the cylindrical bearing member having a closed end forming a small diameter cylinder portion for receiving the radial bearing portion of the rotational shaft and an open end forming a large diameter cylinder portion for receiving the disc-shaped thrust bearing portion such that a plurality of first gaps for receiving a lubricating oil are formed between the rotational shaft and the cylindrical bearing member;
    a disc-shaped thrust pressure member connected to the cylindrical bearing member to form a capillary seal between the rotational shaft and the open end of the cylindrical bearing member and to form a plurality of second gaps between the disc-shaped thrust pressure member and the rotational shaft for receiving a lubricating oil; and
    an oil receiving groove formed in at least one of the disc-shaped thrust pressure member and the rotational shaft for receiving a lubricating oil.

2. A spindle motor according to claim 1; wherein the closed end of the cylindrical bearing member is comprised of an opening formed at an end portion of the small diameter cylinder portion of the cylindrical bearing member and a sealing member sealing the opening in a liquid-tight manner.

3. A rotary device comprising: a spindle motor as set forth in claim 1; and an object mounted on the rotational shaft of the spindle motor for rotation therewith.

4. A spindle motor comprising:

a rotational shaft mounted for undergoing rotation and having a disc-shaped thrust bearing portion at a central part thereof and a radial bearing portion, the disc-shaped thrust bearing portion having a first surface and a second surface;

a cylindrical bearing member for rotatably supporting the rotational shaft, the cylindrical bearing member having a closed end forming a small diameter cylinder portion for receiving the radial bearing portion of the rotational shaft and an open end forming a large diameter cylinder portion for receiving the disc-shaped thrust bearing portion such that a plurality of first gaps for receiving a lubricating oil are formed between the rotational shaft and the cylindrical bearing member;

a disc-shaped thrust pressure member connected to the cylindrical bearing member to form a capillary seal between the rotational shaft and the open end of the cylindrical bearing member and to form a plurality of second gaps between the disc-shaped thrust pressure member and the shaft for receiving a lubricating oil, the disc-shaped thrust pressure member having a surface disposed in confronting relation to the first surface of the disc-shaped thrust bearing portion;

a first thrust bearing formed by the confronting surfaces of the disc-shaped thrust bearing portion of the rotational shaft and the disc-shaped thrust pressure member, the first thrust bearing having a thrust dynamic pressure generating groove;

a second thrust bearing formed by the second surface of the disc-shaped thrust bearing portion and a bordering surface of the small and large diameter cylinder portions of the cylindrical bearing member; and a plurality of oil receiving grooves respectively formed at inner and outer diameter portions of the thrust dynamic pressure generating groove of the first thrust bearing and at inner and outer diameter portions of the second thrust bearing.

5. A spindle motor according to claim 4; wherein the closed end of the cylindrical bearing member is comprised of an opening formed at an end portion of the small diameter cylinder portion of the cylindrical bearing member and a sealing member sealing the opening in a liquid-tight manner.

6. A rotary device comprising: a spindle motor as set forth in claim 4; and an object mounted on the rotational shaft of the spindle motor for rotation therewith.

7. A spindle motor comprising:

a rotational shaft for undergoing rotation and having a disc-shaped thrust bearing portion at a central part thereof and a radial bearing portion;

a cylindrical bearing member for rotatably supporting the rotational shaft, the cylindrical bearing member having a closed end forming a small diameter cylinder portion for receiving the radial bearing portion of the rotational shaft and an open end forming a large diameter cylinder portion for receiving the disc-shaped thrust bearing portion such that a plurality of first gaps for receiving a lubricating oil are formed between the rotational shaft and the cylindrical bearing member;

a disc-shaped thrust pressure member connected to the cylindrical bearing member to form a capillary seal between the rotational shaft and the open end of the cylindrical bearing member and to form a plurality of second gaps between the disc-shaped thrust pressure member and the rotational shaft for receiving a lubricating oil;

a radial bearing formed by an outer circumferential surface of the radial bearing portion of the rotational shaft and an inner circumferential surface of the small diameter cylinder portion of the cylindrical bearing member, the radial bearing having a radial dynamic pressure generating groove having an oil suction side; and an oil receiving groove formed at the oil suction side of the radial dynamic pressure generating groove of the radial bearing.

8. A spindle motor according to claim 7; wherein the closed end of the cylindrical bearing member is comprised of an opening formed at an end portion of the small diameter cylinder portion of the cylindrical bearing member and a sealing member sealing the opening in a liquid-tight manner.

9. A rotary device comprising: a spindle motor as set forth in claim 7; and an object mounted on the rotational shaft of the spindle motor for rotation therewith.

10. A spindle motor comprising:

a rotational shaft mounted for undergoing rotation and having a disc-shaped thrust bearing portion at a central part thereof and a radial bearing portion, the disc-shaped thrust bearing portion having a first surface and a second surface;

a cylindrical bearing member for rotatably supporting the rotational shaft, the cylindrical bearing member having a closed end forming a small diameter cylinder portion for receiving the radial bearing portion of the rotational shaft and an open end forming a large diameter cylinder portion for receiving the disc-shaped thrust bearing portion such that a plurality of first gaps for receiving a lubricating oil are formed between the rotational shaft and the cylindrical bearing member;

a disc-shaped thrust pressure member connected to the cylindrical bearing member to form a capillary seal between the rotational shaft and the open end of the cylindrical bearing member and to form a plurality of second gaps between the disc-shaped thrust pressure member and the rotational shaft for receiving a lubricating oil, the disc-shaped thrust pressure member having a surface disposed in confronting relation to the first surface of the disc-shaped thrust bearing portion;

a first thrust bearing formed by the confronting surfaces of the disc-shaped thrust bearing portion of the rotational shaft and the disc-shaped thrust pressure member, the first thrust bearing having a thrust dynamic pressure generating groove;

a second thrust bearing formed by the second surface of the disc-shaped thrust bearing portion and a bordering surface of the small and large diameter cylinder portions of the cylindrical bearing member;

a plurality of first oil receiving grooves respectively formed at inner and outer diameter portions of the thrust dynamic pressure generating groove of the first thrust bearing and at inner and outer diameter portions of the second thrust bearing; and a radial bearing formed by an outer circumferential surface of the radial bearing portion of the rotational shaft and an inner circumferential surface of the small diameter cylinder portion of the cylindrical bearing member, the radial bearing having a radial dynamic pressure generating groove having an oil suction side; and a second oil receiving groove formed at the oil suction side of the radial dynamic pressure generating groove of the radial bearing.

11. A spindle motor according to claim 10; wherein the closed end of the cylindrical bearing member is comprised of an opening formed at an end portion of the small diameter cylinder portion of the cylindrical bearing member and a sealing member sealing the opening in a liquid-tight manner.

12. A rotary device comprising: a spindle motor as set forth in claim 10; and an object mounted on the rotational shaft of the spindle motor for rotation therewith.

13. A spindle motor comprising:
a rotational shaft for undergoing rotation and having a disc-shaped thrust bearing portion at a central part thereof and a radial bearing portion, the disc-shaped thrust bearing portion having a first surface and a second surface;
a cylindrical bearing member for rotatably supporting the rotational shaft, the cylindrical bearing member having a closed end forming a small diameter cylinder portion for receiving the radial bearing portion of the rotational shaft and an open end forming a large diameter cylinder portion for receiving the disc-shaped thrust bearing portion such that a plurality of first gaps for receiving a lubricating oil are formed between the rotational shaft and the cylindrical bearing member;
a disc-shaped thrust pressure member connected to the cylindrical bearing member to form a capillary seal between the rotational shaft and the open end of the cylindrical bearing member and to form a plurality of second gaps between the disc-shaped thrust pressure member and the shaft for receiving a lubricating oil, the disc-shaped thrust pressure member having a surface disposed in confronting relation to the first surface of the disc-shaped thrust bearing portion;
a first thrust bearing formed by the confronting surfaces of the disc-shaped thrust bearing portion of the rotational shaft and the disc-shaped thrust pressure member, the first thrust bearing having a thrust dynamic pressure generating groove;
a second thrust bearing formed by the second surface of the disc-shaped thrust bearing portion and a bordering surface of the small and large diameter cylinder portions of the cylindrical bearing member;
a plurality of first oil receiving grooves respectively formed at inner and outer diameter portions of the thrust dynamic pressure generating groove of the first thrust bearing and at inner and outer diameter portions of the second thrust bearing; and
a radial bearing formed by an outer circumferential surface of the radial bearing portion of the rotational shaft and an inner circumferential surface of the small diameter cylinder portion of the cylindrical bearing member, the radial bearing having a radial dynamic pressure generating groove having an oil suction side;
a second oil receiving groove formed at the oil suction side of the radial dynamic pressure generating groove of the radial bearing;
a rotor connected to the rotational shaft for rotation therewith;
a plurality of rotor magnets mounted on the rotor; a stator having a magnetic center; and
a stator coil mounted on the stator;
wherein the rotor magnets are mounted on the rotor and the stator coil is mounted on the stator so that the magnetic center of the stator coincides with a central axis of the disc-shaped thrust bearing portion of the rotational shaft.

14. A spindle motor according to claim 13; wherein the closed end of the cylindrical bearing member is comprised of an opening formed at an end portion of the small diameter cylinder portion of the cylindrical bearing member and a sealing member sealing the opening in a liquid-tight manner.

15. A rotary device comprising: a spindle motor as set forth in claim 13; and an object mounted on the rotational shaft of the spindle motor for rotation therewith.

16. In a spindle motor having a rotor, a stator and a dynamic pressure bearing for supporting the rotor for rotation relative to the stator, the dynamic pressure bearing comprising:
a rotational shaft mounted for undergoing rotation and having a thrust bearing portion and a radial bearing portion;
a bearing member for rotatably supporting the rotational shaft, the bearing member having a closed end forming a small diameter cylinder portion for receiving the radial bearing portion of the rotational shaft and an open end forming a large diameter cylinder portion for receiving the thrust bearing portion of the rotational shaft such that a plurality of first gaps for receiving a lubricating oil are formed between the rotational shaft and the bearing member;
a thrust pressure member connected to the bearing member to form a capillary seal between the rotational shaft and the open end of the bearing member and to form a plurality of second gaps between the thrust pressure member and the rotational shaft for receiving a lubricating oil; and an oil receiving groove formed in at least one of the thrust pressure member and the rotational shaft for receiving a lubricating oil.

17. A spindle motor according to claim 16; wherein the closed end of the cylindrical bearing member is comprised of an opening formed at an end portion of the small diameter cylinder portion of the cylindrical bearing member and a sealing member sealing the opening in a liquid-tight manner.

18. A rotary device comprising: a spindle motor as set forth in claim 16; and an object mounted on the rotational shaft of the spindle motor for rotation therewith.

19. A dynamic pressure bearing comprising:
a rotational shaft mounted for undergoing rotation and having a thrust bearing portion and a radial bearing portion;
a bearing member for rotatably supporting the rotational shaft, the bearing member having a closed end forming a small diameter cylinder portion for receiving the radial bearing portion of the rotational shaft and an open end forming a large diameter cylinder portion for receiving the thrust bearing portion of the rotational shaft such that a plurality of first gaps for receiving a lubricating oil are formed between the rotational shaft and the bearing member;
a thrust pressure member connected to the bearing member to form a capillary seal between the rotational shaft and the open end of the bearing member and to form a plurality of second gaps between the thrust pressure member and the rotational shaft for receiving a lubricating oil; and an oil receiving groove formed in at least one of the thrust pressure member and the rotational shaft for receiving a lubricating oil.

20. A dynamic pressure bearing according to claim 19; wherein the closed end of the cylindrical bearing member is comprised of an opening formed at an end portion of the small diameter cylinder portion of the cylindrical bearing member and a sealing member sealing the opening in a liquid-tight manner.

21. A rotary device comprising: a rotor; a stator; and a dynamic pressure bearing as set forth in claim 19 for supporting the rotor for rotation relative to the stator.

* * * * *